United States Patent [19]
Kikuiri et al.

[11] Patent Number: 5,493,868
[45] Date of Patent: Feb. 27, 1996

[54] AIR CONDITIONING APPARATUS USABLE FOR WIDE-RANGE SOURCE VOLTAGE

[75] Inventors: Yoshio Kikuiri, Ooizumimachi; Yoshihiro Nakamura, Yoriimachi, both of Japan

[73] Assignee: Sanyo Electric Co., Ltd., Oosaka, Japan

[21] Appl. No.: 330,306

[22] Filed: Oct. 27, 1994

[30] Foreign Application Priority Data

Nov. 9, 1993 [JP] Japan .................................. 5-279477
Jan. 28, 1994 [JP] Japan .................................. 6-008747

[51] Int. Cl.$^6$ .............................. F24F 11/00; H02P 7/00
[52] U.S. Cl. .................... 62/129; 62/228.4; 62/230; 318/807; 361/22
[58] Field of Search .................. 62/129, 126, 127, 62/230, 228.4, 208, 209; 318/807, 811, 801; 361/22, 31, 30, 33, 93; 307/31, 33, 35; 363/109

[56] References Cited

U.S. PATENT DOCUMENTS

| | | | |
|---|---|---|---|
| 4,488,100 | 12/1984 | Fujii et al. | 318/798 |
| 4,497,057 | 1/1985 | Kato et al. | 371/29 |
| 4,735,058 | 4/1988 | Umezu et al. | 62/230 X |
| 4,736,595 | 4/1988 | Kato | 62/228.4 X |
| 4,968,338 | 11/1990 | Sugiyama | 361/22 X |
| 5,179,842 | 1/1993 | Kanazawa | 318/811 X |
| 5,199,274 | 4/1993 | Yoshida et al. | 62/228.4 |
| 5,209,075 | 5/1993 | Kim | 361/22 X |

FOREIGN PATENT DOCUMENTS

| | | |
|---|---|---|
| 0431563 | 12/1991 | European Pat. Off. . |
| 2174259 | 10/1986 | United Kingdom . |
| 2256940 | 12/1992 | United Kingdom . |

OTHER PUBLICATIONS

Patent Abstracts of Japan vol. 16, No. 233 (E-1209), 28 May 1992 and JP-A-04 046589, 17 Feb. 1992.
Patent Abstracts of Japan vol. 13, No. 355 (P-914), 9 Aug. 1989 and JP-A-01 114916, 8 May 1989.

*Primary Examiner*—Harry B. Tanner
*Attorney, Agent, or Firm*—Darby & Darby

[57] ABSTRACT

In air conditioner having a power-variable compressor, an inverter for varying the driving frequency of the compressor through V/f control, a controller for supplying a variable-frequency control instruction in accordance with the air conditioning load to the inverter, and an input voltage detector for detecting a source voltage input to the inverter, the controller includes reference means for beforehand storing V/f value data corresponding to plural voltage sections to which a predetermined range of the input voltage to the inverter is divided at a predetermined voltage interval, and selects data representing the ratio (V/f) of the output voltage (V) corresponding to the detected input voltage and the driving frequency (f) from the reference means to output the variable frequency control instruction to the inverter so that an air conditioning operation is carried out in accordance with the air conditioning load.

14 Claims, 9 Drawing Sheets

TBL1: V/F CONTROL COMPENSATING TABLE AT CONTROL REFERENCE VOLTAGE V01

TBL2: V/F CONTROL COMPENSATING TABLE AT CONTROL REFERENCE VOLTAGE V02

TBL3: V/F CONTROL COMPENSATING TABLE AT CONTROL REFERENCE VOLTAGE V03

FIG. 4

V/F CONTROL COMPENSATING TABLE (TBL1)

| DRIVING FREQUENCY f Hz | VARIED VOLTAGE ΔV (%) | | | | | | | |
|---|---|---|---|---|---|---|---|---|
| | 0 | 1 | 2 | 3 | 4 | 5 | - - - - - - - | 9 |
| 00 ~ 09 | -12 | -12 | - - - - - | | | | | |
| 10 ~ 19 | ¦ | ¦ | | | | | | |
| 20 ~ 29 | ¦ | ¦ | | | (V/f VALUE) | | | |
| 30 ~ 39 | -20 | -21 | - - - - - | | | | | |
| ¦ | ¦ | ¦ | | | | | | |
| ¦ | ¦ | ¦ | | | | | | |
| 120 ~ 129 | -20 | -20 | - - - - - | | | | | |

FIG. 10

WARNING CONTENT AND LED DISPLAY   ● = TURN ON   ○ = TURN OUT

| | | | LED LAMP | | | | | | | |
|---|---|---|---|---|---|---|---|---|---|---|
| | | | L8 | 7 | 6 | 5 | 4 | 3 | 2 | 1 |
| M1: SELF-DIAGNOSIS DISPLAY MODE | ○○○ | RECEPTION FAILURE | ○ | ○ | ● | ○ | ○ | ○ | ○ | ● |
| | △△△ | TRANSMISSION FAILURE | ○ | ○ | ● | ○ | ○ | ○ | ● | ○ |
| | ○○ | RECEPTION FAILURE | ○ | ○ | ● | ○ | ○ | ○ | ● | ● |
| | △△ | RECEPTION FAILURE | ○ | ○ | ● | ○ | ○ | ● | ○ | ○ |
| | □□ | TRANSMISSION FAILURE | ○ | ○ | ● | ○ | ○ | ● | ○ | ● |
| | ◎◎ | RECEPTION FAILURE | ○ | ○ | ● | ○ | ○ | ● | ● | ○ |
| | ○○○ | THERMISTOR DEFECTIVE | ○ | ● | ● | ○ | ○ | ○ | ○ | ● |
| | △△△ | THERMISTOR DEFECTIVE | ○ | ● | ● | ○ | ○ | ○ | ● | ○ |
| | ◎◎◎ | THERMISTOR DEFECTIVE | ○ | ● | ● | ○ | ○ | ○ | ● | ● |
| | ○○ | WARNING | ○ | ○ | ○ | ○ | ○ | ● | ○ | ○ |
| | △△ | SENSOR ABNORMAL | ● | ● | ○ | ○ | ● | ○ | ○ | ○ |
| M2: VOLTAGE ADJUSTMENT DISPLAY MODE | | 400V INPUT TIME (STANDARD) | ○ | ○ | ○ | ○ | ○ | ○ | ● | ○ |
| | | VD = SLIGHT LOWER | ○ | ○ | ○ | ○ | ○ | ○ | ● | ● |
| | | VD = DEFICIENT | ○ | ○ | ○ | ○ | ○ | ○ | ○ | ● |
| | | VD = SLIGHT HIGHER | ○ | ○ | ○ | ○ | ○ | ● | ● | ○ |
| | | VD = EXCESSIVE | ○ | ○ | ○ | ○ | ○ | ● | ○ | ○ |

DSP2 (L8–L3)   DSP1 (L2–L1)

DSP1: ADJUSTMENT STAGE DISPLAY
DSP2: VOLTAGE SECTION DISPLAY

AIR CONDITIONING APPARATUS USABLE FOR WIDE-RANGE SOURCE VOLTAGE

BACKGROUND OF THE DISCLOSURE

1. Field of the Invention

This invention relates to an air conditioning apparatus having a power-variable type compressor whose power is variable using an inverter, and particularly to an air conditioning apparatus using an improved adjustment technique for adjusting the output of a source voltage detection circuit.

2. Description of Related Art

Recently, an inverter air conditioning apparatus (hereinafter referred to as "inverter air conditioner") has broadly propagated as an air conditioning apparatus which is capable of adjusting the temperature in a room or the like in fine level. The inverter air conditioner is designed so that the rotating frequency of a motor of a compressor is varied in accordance with an air conditioning load which is detected on the basis of the temperature detected by a temperature sensor, thereby varying a compression power of the compressor. Through this air conditioning operation, a space such as a room or the like is kept in the optimum air conditional state.

In general, a package type inverter air conditioner adopts an open loop control operation using a V/f control in which the motor is controlled on the basis of the ratio (V/f) of an output voltage of the inverter (an input voltage of the motor) and a driving frequency f of the motor.

In the V/f control type inverter air conditioner as described above, when the input voltage of the inverter is varied (fluctuated), the output voltage of the inverter is also varied substantially at the same level as variation of the input voltage at the same driving frequency. In consideration of the variation of the input voltage to the inverter, a permissible voltage range ΔV with a center voltage C at the center of the voltage range is set for the output voltage to avoid troubles due to the variation of the input voltage to some extent.

However, when the input voltage is beyond a variation upper-limit value UL or a variation lower-limit value LL, the following trouble occurs.

That is, when the input voltage increases greatly at a low driving frequency f1 represented by a in FIG. 7, the output voltage exceeds the upper limit value UL and thus an excessive voltage is applied to the motor, so that the motor falls into an overexcitation state. If the overexcitation is remarkable, the temperature of an excitation winding of the motor is increased, and the excitation winding may be burned out.

On the other hand, when the input voltage decreases greatly at a high driving frequency region f2 to f3 which is represented by b in FIG. 7, the output voltage of the inverter is beyond the lower limit value LL to induce torque lack to the motor, so that the driving efficiency of the inverter is lowered.

For inverter air conditioners for overseas, that is, inverters for exportation, they must be designed on the basis of voltage specifications which meet the respective power circumstances of import countries, however, it is impractical in cost to design individual types of inverter air conditioners to meet the voltage specifications for the power circumstances of the respective countries. Therefore, it is preferable that the inverter air conditioners are commonly designed to be of a wide range type in which an usable voltage range is wide. However, various different commercial source voltages are used in individual countries in the world, and thus it is extremely difficult to provide these countries with only one kind of inverter air conditioner even if it is designed in consideration of occurrence of the voltage variation (fluctuation) as described above. Particularly, the above problem due to the voltage variation becomes more remarkable in the wide range type of inverter air conditioner.

Further, in order to provide the wide range type of inverter air conditioner, it is required to automatically detect the source voltage (input voltage VIN) of a voltage source to which the inverter air conditioner is connected to perform the V/f control in accordance with the detected voltage VD.

In view of the foregoing, in this type of conventional inverter air conditioner, the source voltage VIN is detected using a source voltage detection circuit which comprises a stepdown transformer rectifying circuit and a smoothing circuit, and then a detection signal VD (DC voltage) representing the input source voltage VIN is supplied from the source voltage detection circuit to an A/D conversion input port of a microcomputer serving as a controller in the inverter air conditioner to perform the V/f control in accordance with the source voltage on the basis of a driving control program stored in the microcomputer.

With this construction, the source voltage detection circuit is designed so that the corresponding relation between the source voltage VIN and the detection signal VD is set to meet the conversion rate of the A/D conversion input port attached to the microcomputer. For example, for the source voltage VIN of AC 400 V, the source voltage detection circuit is designed so that the detection voltage (signal) VD is equal to 3.91 V.

However, some actually-manufactured source voltage detection circuits do not necessarily provide the detection voltage VD which is expected in circuit design because of fluctuation in characteristics of stepdown transformers, diodes of rectifying circuits or other resistance elements, etc.

SUMMARY OF THE INVENTION

An object of the present invention is to provide an air conditioning apparatus which is capable of performing the optimum V/f control at all times irrespective of occurrence of a wide range of voltage variation.

Another object of the present invention is to provide an air conditioning apparatus in which the output (detection) voltage of a source voltage detection circuit can be easily adjusted, and a driving operation can be performed with high precision on the basis of the adjusted detection voltage.

In order to attain the above objects, according to one aspect of the present invention, an air conditioner includes a power-variable compressor, an inverter for controlling the compressor to vary a driving frequency of the compressor on the basis of the ratio of an output voltage (V) thereof which corresponds to an air conditioning load and a driving frequency (f) of the compressor, a controller for supplying a variable-frequency control instruction in accordance with the air conditioning load to the inverter, and an input voltage detector for detecting a source voltage input to the inverter, wherein the controller includes reference means for beforehand storing V/f value data corresponding to plural voltage sections to which a predetermined range of the input voltage to the inverter is divided at a predetermined voltage interval, and selects data representing the ratio (V/f) of the output voltage (V) corresponding to the detected input voltage and the driving frequency (f) from said reference means to output the variable frequency control instruction to the inverter so that an air conditioning operation is carried out in accordance with the air conditioning load.

When the V/f value data (representing the ratio of the output voltage of the inverter and the driving frequency of the motor) are read out from the reference means, the controller may stop the operation of the compressor.

According to another aspect of the present invention, an inverter type air conditioner includes source voltage detection means for detecting a voltage of a voltage source connected to said air conditioner, and A/D conversion means which conducts A/D-conversion on the detected source voltage and whose conversion rate is beforehand set, the driving frequency of a compressor being variably controlled on the basis of the A/D-converted detection voltage, wherein the A/D conversion means includes voltage adjusting means which is provided between an output portion of the source voltage detection means and an input portion of the A/D conversion means and serves to adjust the voltage level of the detected voltage output from the source voltage detection means to a predetermined input voltage level, and monitor display means for indicating a coincidence degree between the predetermined input voltage level of the A/D conversion means and the voltage level of the detected source voltage.

According to the first aspect of the present invention, the input voltage detection means detects the input voltage to the inverter to output a detection signal to the controller. The controller selects the optimum V/f value corresponding to the input voltage detection signal from the plural V/f value data stored in the reference means, and supplies the inverter with a driving instruction based on the selected V/f value. Therefore, irrespective of the variation of the input voltage, the V/f value is selectively switched to the optimum V/f value which corresponds to an input voltage after the voltage variation, so that the air conditioning operation can be accurately performed in accordance with the air conditioning load at all times.

According to the second aspect of the present invention, the voltage level of the detection output signal from the input (source) detection means can be adjusted by the voltage adjusting means, and the coincidence degree between the voltage level of the detection signal at that time and the predetermined input voltage level of the A/D conversion means is monitored and displayed on the monitor display means. Therefore, the detection signal voltage level can be adjusted to a proper value while seeing a display state on the display unit.

BRIEF DESCRIPTION OF THE DRAWINGS

FIG. 4 is a table showing a content of the V/f control compensating table;

FIG. 10 is a table showing the corresponding relation between a display content of the LED display unit and a turn-on state.

DETAILED DESCRIPTION OF PREFERRED EMBODIMENTS

Preferred embodiments according to this invention will be described with reference to the accompanying drawings.

First Embodiment

Figure 1:
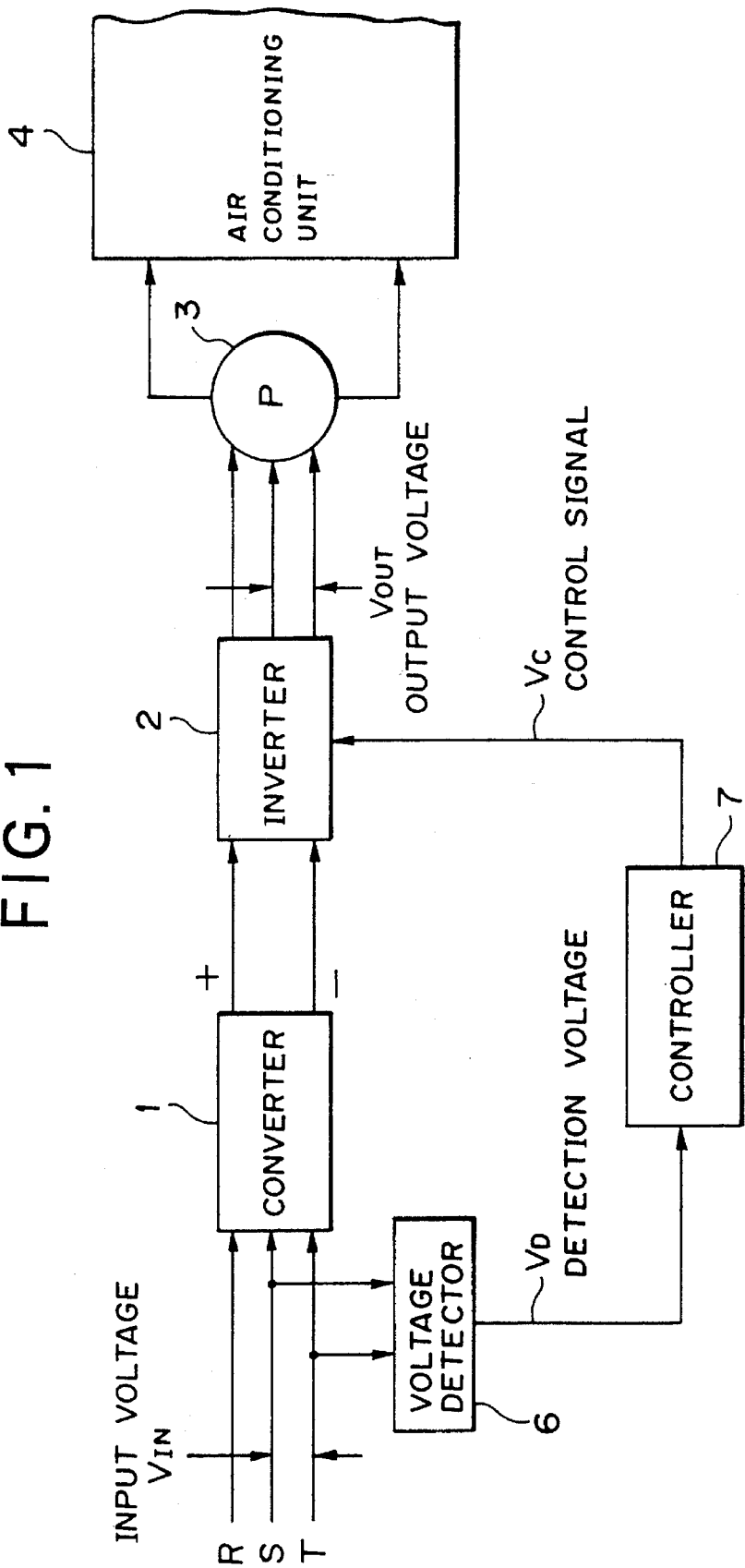
FIG. 1 is a block diagram showing the whole construction of an air conditioning apparatus of a first embodiment according to this invention.

FIG. 1 is a block diagram showing a first embodiment of an inverter air conditioner according to this invention.

In the inverter air conditioner shown in FIG. 1, a converter 1 is connected to a three-phase AC source (R,S,T) and supplied with three-phase AC power (voltage) to convert (rectify) the three-phase AC power to DC power and supply it to an inverter 2. The inverter 2 supplies three-phase driving power of a frequency corresponding to a current air conditioning load to a motor of a compressor 3 in accordance with a control signal Vc having variable driving frequency which is supplied from a controller 7. The compression power of the compressor 3 is varied in accordance with the three-phase driving power from the inverter 2, and an air conditioning load follow type of air-conditioning operation is performed by varying a circulation amount of refrigerant in an air conditioning unit.

An input voltage detection circuit 6 for detecting the input voltage VIN (a line voltage between S and T phases of the three-phase AC power (R, S and T) in this embodiment) is connected to the input side of the converter 1.

Figure 2:
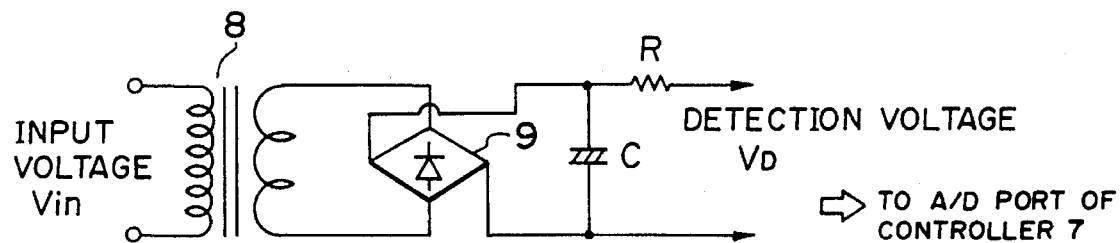
FIG. 2 is a circuit diagram showing an embodiment of a voltage detection circuit.

FIG. 2 is a circuit diagram showing the input voltage detection circuit. As is apparent from FIG. 2, the input voltage detection circuit 6 includes an insulating transformer 8 for reducing the input voltage VIN to a voltage suitable for a subsequent signal processing, a bridge rectifying circuit 9 for rectifying the secondary voltage of the reduced voltage, and a capacitor and a resistor which constitute a ripple filter for removing a ripple component of the rectified output of the bridge rectifying circuit 9. The input voltage detection circuit 6 outputs the detection voltage VD to the A/D conversion input port of the controller 7.

The circuit construction of the input voltage detection circuit 6 is not limited to the embodiment shown in FIG. 2, and any modification may be made to the circuit construction if necessary. The controller 7 may be formed of a microcomputer (not shown). In this case, the detection voltage $V_D$ is applied to the A/D conversion input port of the microcomputer.

The microcomputer includes a ROM (read only memory) in which a control operating program (not shown) is stored, and another ROM (read only memory) serving as a reference means in which V/f value data as described later are stored, and it collectively and suitably controls the inverter 2 and the whole of the air conditioning apparatus in accordance with a desired input signal (for example, a temperature detection signal from a temperature sensor for detecting the air condition load or the like).

Figure 3:
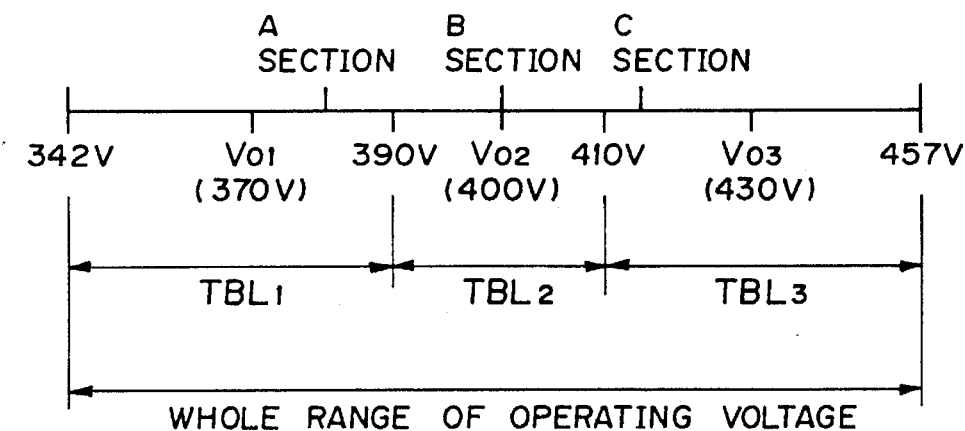
FIG. 3 is a diagram showing the corresponding relation between a sectional example of an input voltage and a V/f control compensating table.

The V/f value data are stored in the ROM in the form of a V/f control compensating table (hereinafter referred to as "table"), and an example of the table is shown in FIGS. 3 and 4.

In this embodiment, in order to allow the inverter air conditioner to be used for the wide-range input voltage VIN, three kinds of tables TBL1, TBL2 and TBL3 as shown in FIG. 3 are provided as the table in correspondence with three voltage sections A, B and C for the input voltage VIN. That is, the wide-range input voltage VIN is mainly divided into the three voltage sections A, B and C. The table TBL1 contains V/f values every predetermined frequency f in a voltage range of 342 V to 389 V with a control reference voltage V01 (for example, 370 V) at the center of the voltage range (see FIG. 4), the table TBL2 has V/f values every predetermined frequency f in a voltage range of 390 V to 409 V with a control reference voltage V02 (for example, 400 V) at the center of the voltage range, and the TBL3 has V/f values every predetermined frequency f in a voltage range of 410 V to 457 V with a control reference voltage V03 (for example, 430 V) at the center of the voltage range.

Next, the driving operation of the inverter air conditioner of this embodiment will be described.

Figure 5:
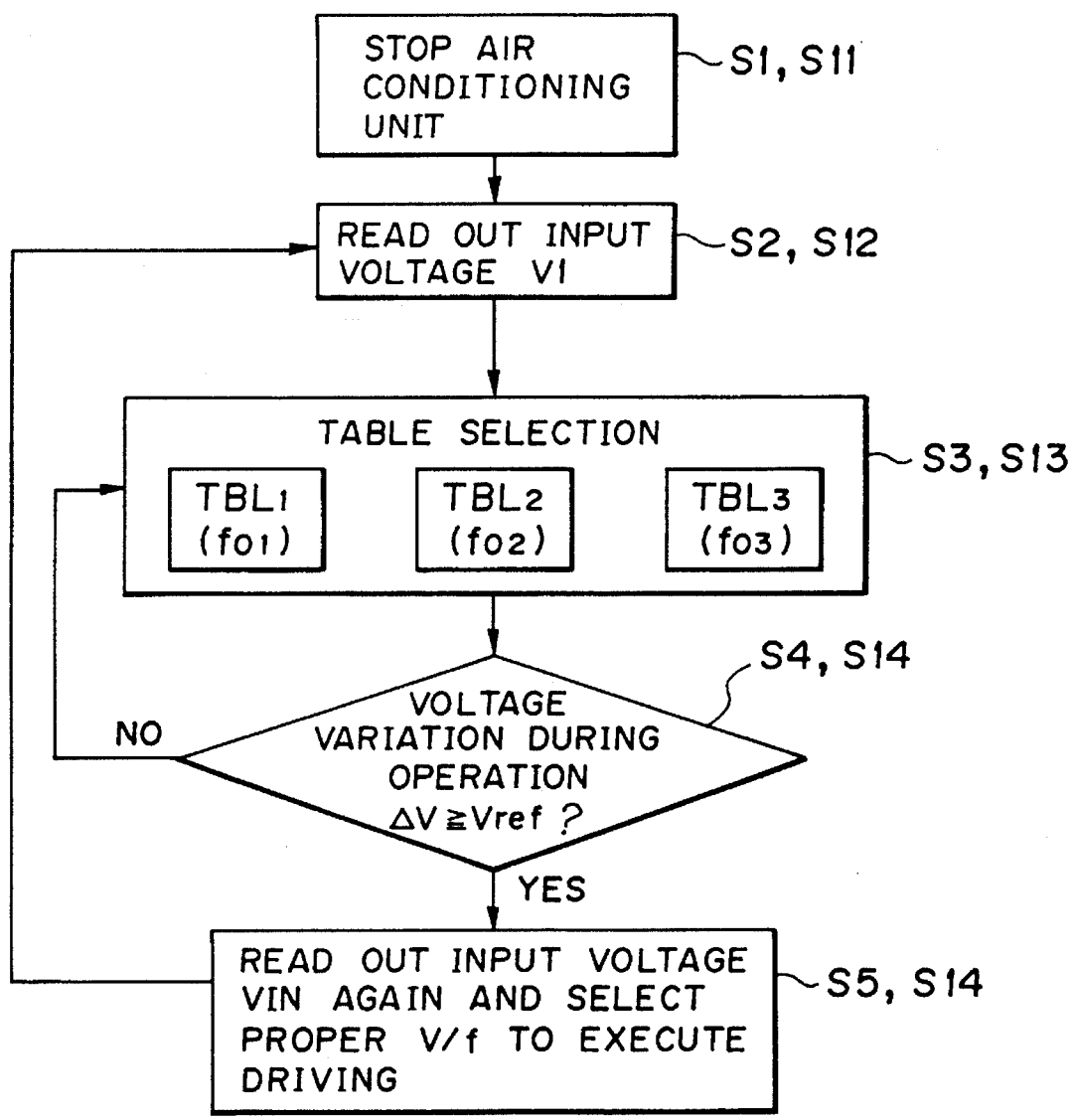
FIG. 5 is a flowchart showing a driving operation of the air conditioning apparatus of the first embodiment according to this invention.

FIG. 5 is a flowchart showing the driving operation of the inverter air conditioner. First, the input voltage VIN supplied to the converter 1 must be read out to perform the proper V/f control. The read-out operation of the input voltage VIN is performed by the voltage detection circuit 6 in a state where the operation of the air conditioning unit 4 is stopped (specifically, while the operation of the parts associated with flow of the refrigerant such as the converter 1, the inverter 2, the compressor 3, etc. are stopped) (step S1, S2).

The determination of the input voltage VIN is preferably made on the basis of the average value of voltage values which are read out (measured) for a predetermined time. The detection voltage VD of the voltage detection circuit 6 is input to the controller 7. The controller 7 executes the following operating control according to the algorithm shown in FIG. 5.

That is, one of the three tables in which the optimum V/f values (f01 to f03) corresponding to the detection voltage VD are stored is selected (step S3). When the input voltage is unvaried in this state, that is, when the variation rate ΔV is within a predetermined reference value Vref, the compressor 3 is driven using the V/f value at that time according to a driving control flow (not shown) and the steps S3 and S4 are repeated. On the other hand, when the variation rate ΔV of the input voltage VIN exceeds the reference value Vref (step S4:Yes), the process goes to step S5 to read out the input voltage VIN again. At this time, in order to keep safety for the operation, the input voltage VIN is read out again while the operation of the air conditioning unit 4 is temporarily stopped. However, it is not required to stop the operation of the air conditioning unit 4 if alteration of the V/f value which is required due to alteration of the table can be smoothly performed. In this case, a program for moderately altering the V/f value or the like may be provided at the step S3.

As described above, when the input voltage VIN is varied, the optimum V/f value corresponding to the input voltage VIN after variation is selected again, and then the air conditioning operation is performed on the basis of the selected optimum V/f value.

Figure 6:
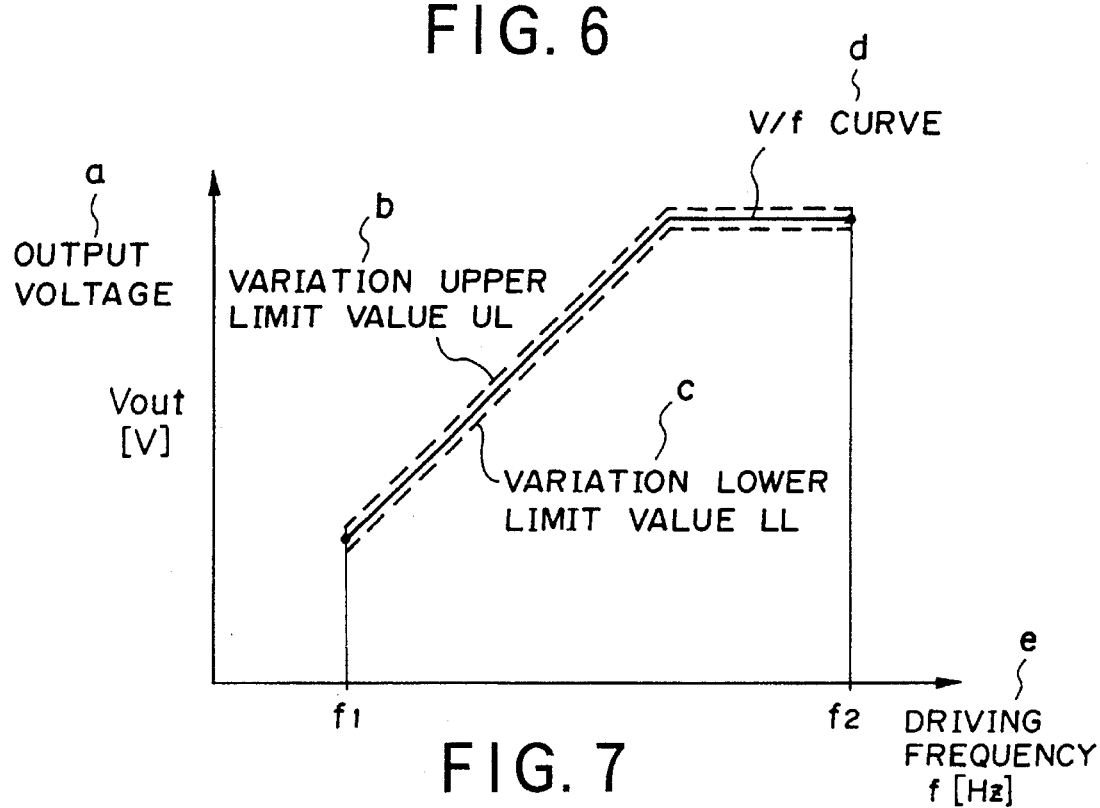
FIG. 6 is a graph showing a V/f control characteristic of the first embodiment according to this invention.
Figure 7:
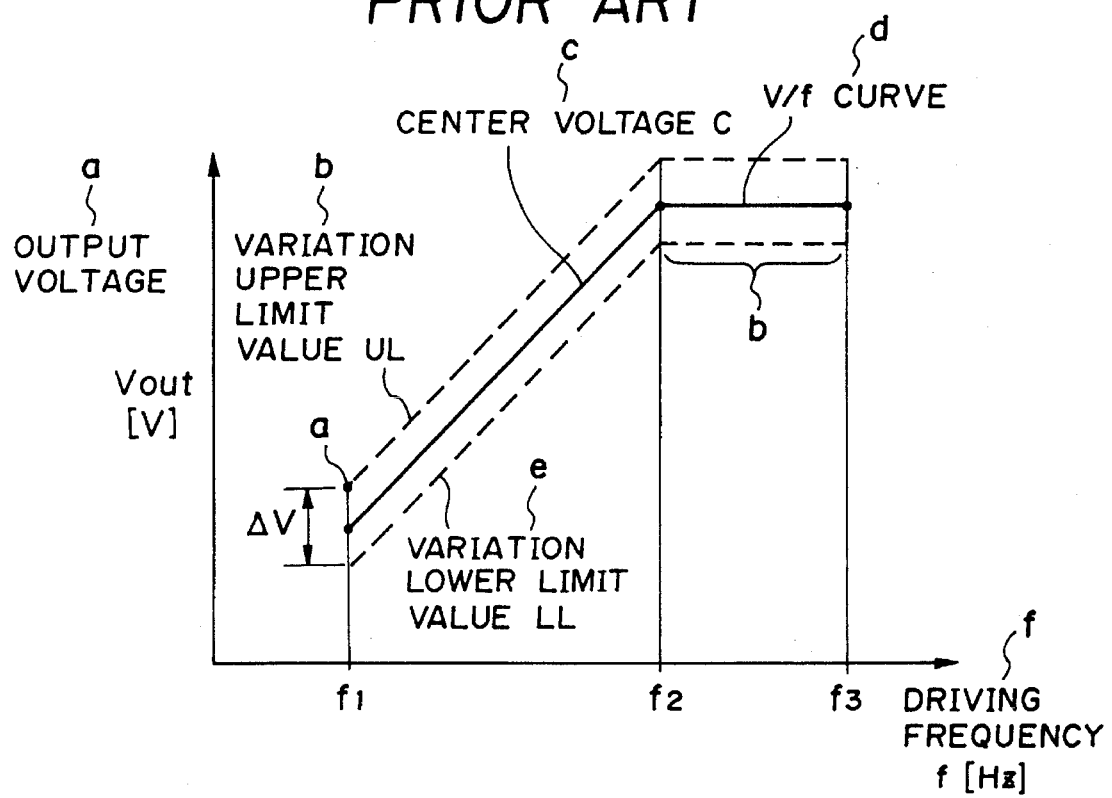
FIG. 7 is a graph showing a V/f control characteristic of the prior art.

Accordingly, according to the inverter air conditioner of this embodiment, even when the inverter air conditioner is placed and used in countries or areas where the different voltage sections shown in FIG. 3 are respectively applied, the proper and optimum table is automatically selected from the V/f control compensating tables TBL1, TBL2 and TBL3 to meet the voltage circumstances of each country or area insofar as one of the three V/f control compensating tables is applicable to these countries or areas. Therefore, the wide range operation of the air conditioner can be performed. In addition, the output voltage VOUT of the inverter 2 is not greatly varied unlike the prior art (see FIG. 7), and fluctuation (variation) degree from the center voltage C in the up-and-down direction is more reduced as shown in FIG. 6, so that there occur no overexcitation and no torque deficiency in the motor of the compressor 3.

Second Embodiment

Next, a second embodiment of the inverter air conditioner according to this invention will be described. This embodiment is substantially identical to the first embodiment except that a display unit for a self-diagnosis display and a voltage adjustment is further provided.

Figure 8:
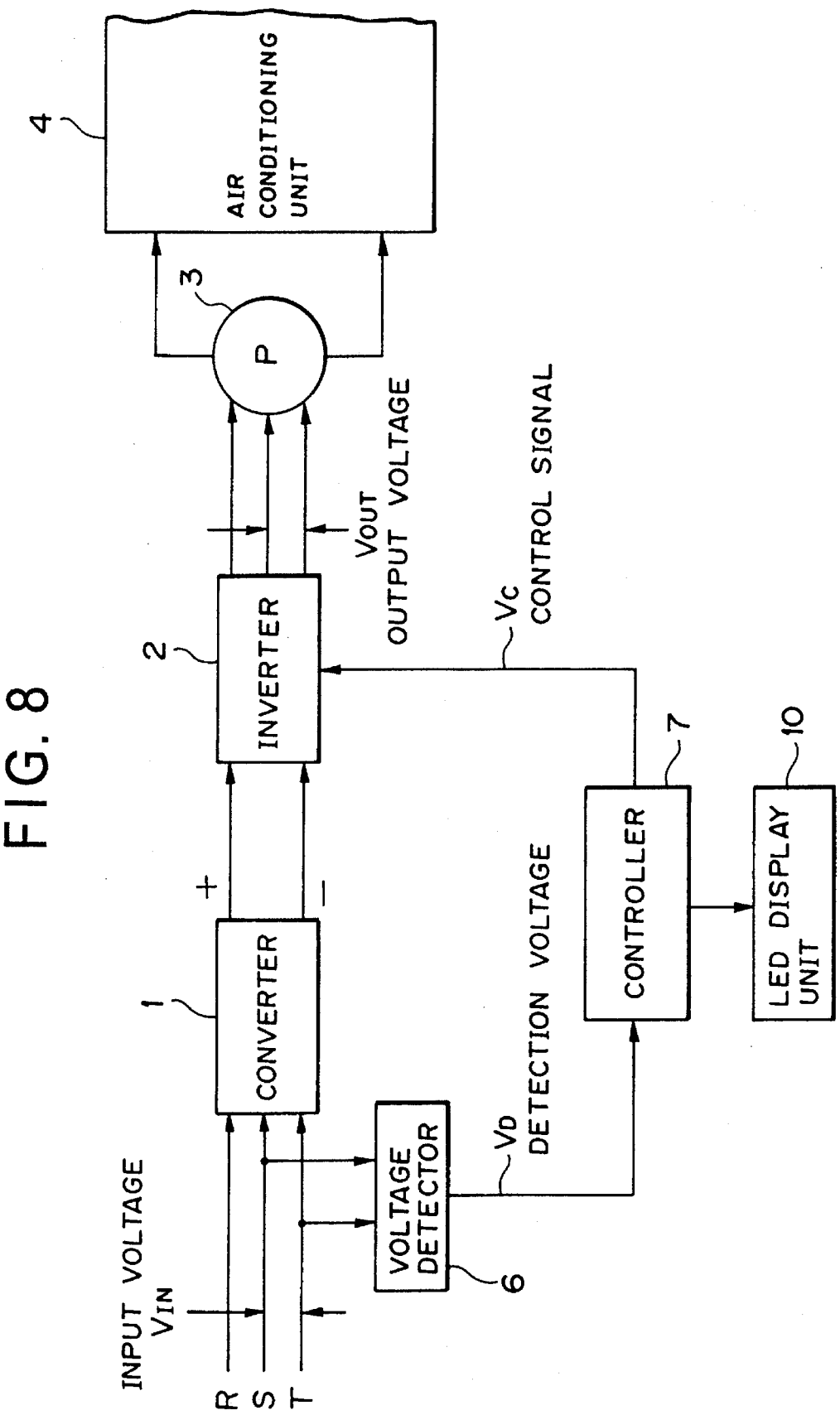
FIG. 8 is a block diagram showing the whole construction of an air conditioning apparatus of a second embodiment according to this invention.

FIG. 8 is a block diagram showing the whole construction of the second embodiment according to this invention. In the following description, the same elements as the first embodiment are represented by the same reference numerals.

In the inverter air conditioner shown in FIG. 8, the converter 1 is connected to the three-phase AC source (R,S,T) and supplied with three-phase AC power to convert (rectify) the three-phase AC power to DC power and supply it to the inverter 2. The inverter 2 supplies three-phase driving power having the frequency corresponding to an air condition load to the motor of the compressor 3 in accordance with a control signal Vc having variable driving frequency which is supplied from a controller 7. The controller 7 generates a control voltage Vc on the basis of a detection voltage VD from the voltage detection circuit 6 which is connected across the S-phase and T-phase at the input side of the converter 1, and supplies the control voltage Vc to the inverter 2. The compression power of the compressor 3 is varied in accordance with the three-phase driving power from the inverter 2, and an air-conditioning load follow type of air-conditioning operation is performed by varying a circulation amount of refrigerant in the air conditioning unit. In this embodiment, a display unit 10 is further connected to the controller 7, and operation states (containing abnormal state) of respective parts in the inverter air conditioner and various set states are displayed on the LED display unit 10.

Figure 9:
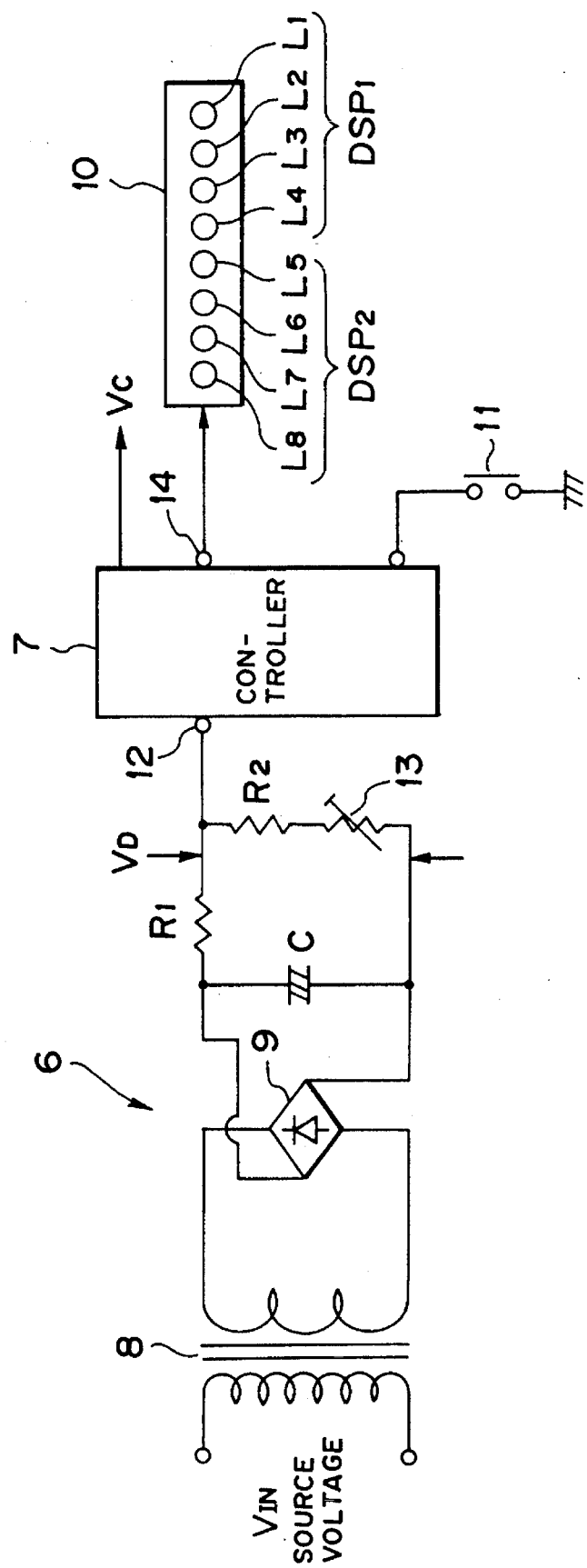
FIG. 9 is a circuit diagram showing the connection relation of a voltage detection circuit, a controller and an LED display unit.

FIG. 9 shows a circuit arrangement of the voltage detection circuit 6, the controller 7 and the LED display unit 10. As is apparent from FIG. 9, the voltage detection circuit 6 includes the insulating transformer 8 for reducing the source voltage VIN to a voltage value suitable for a subsequent signal processing, the bridge rectifying circuit 9 for rectifying the secondary voltage, and a capacitor C and a resistor R1 which constitute the ripple filter for removing a ripple component of the rectified output of the bridge rectifying circuit 3. Further, a voltage divider comprising a resistor R2 and a variable resistor 13 is connected to the output portion of the voltage detection circuit 6, that is, the output stage of the ripple filter. The voltage divider serves as means for adjusting the voltage level of the output voltage of the voltage detection circuit 6, that is, the detection voltage VD. A terminal voltage of the resistor R2 and the variable resistor 13 is input to the A/D conversion input port 12 of the controller 7.

The controller 7 may be formed of a microcomputer (not shown), and the detection voltage VD is input to the A/D conversion input port 12 of the microcomputer. Like the first embodiment, the controller 7 includes a ROM (read only memory) in which a control operating program (not shown) is stored, and another ROM (read only memory) serving as a reference means in which V/f value data as described later are stored, and collectively and suitably controls the inverter 2 and the air conditioner in accordance with a desired input signal (a temperature detection signal from a temperature sensor for detecting an air conditioning load, for example).

The LED display unit 10 includes individually independent plural LED lamps L1 to Ln (eight lamps in this embodiment) which are linearly arranged, and those lamps which are indicated by a display signal from a display output port of the controller 7 are turned on or (turned out).

FIG. 10 shows the corresponding relation between the display content of the LED display unit 10 and the turn-on state of the lamps. As is apparent from FIG. 10, the display mode of the LED display unit 10 is mainly classified into a self-diagnosis display mode M1 and a voltage adjusting mode M2.

When many valves are built in an outdoor unit, flow of refrigerant becomes diverse and the control operation for the valves is complicated. In consideration of such cases, the self-diagnosis display mode M1 is used to assist a service man to diagnose troubles of the air conditioner.

Figure 11:
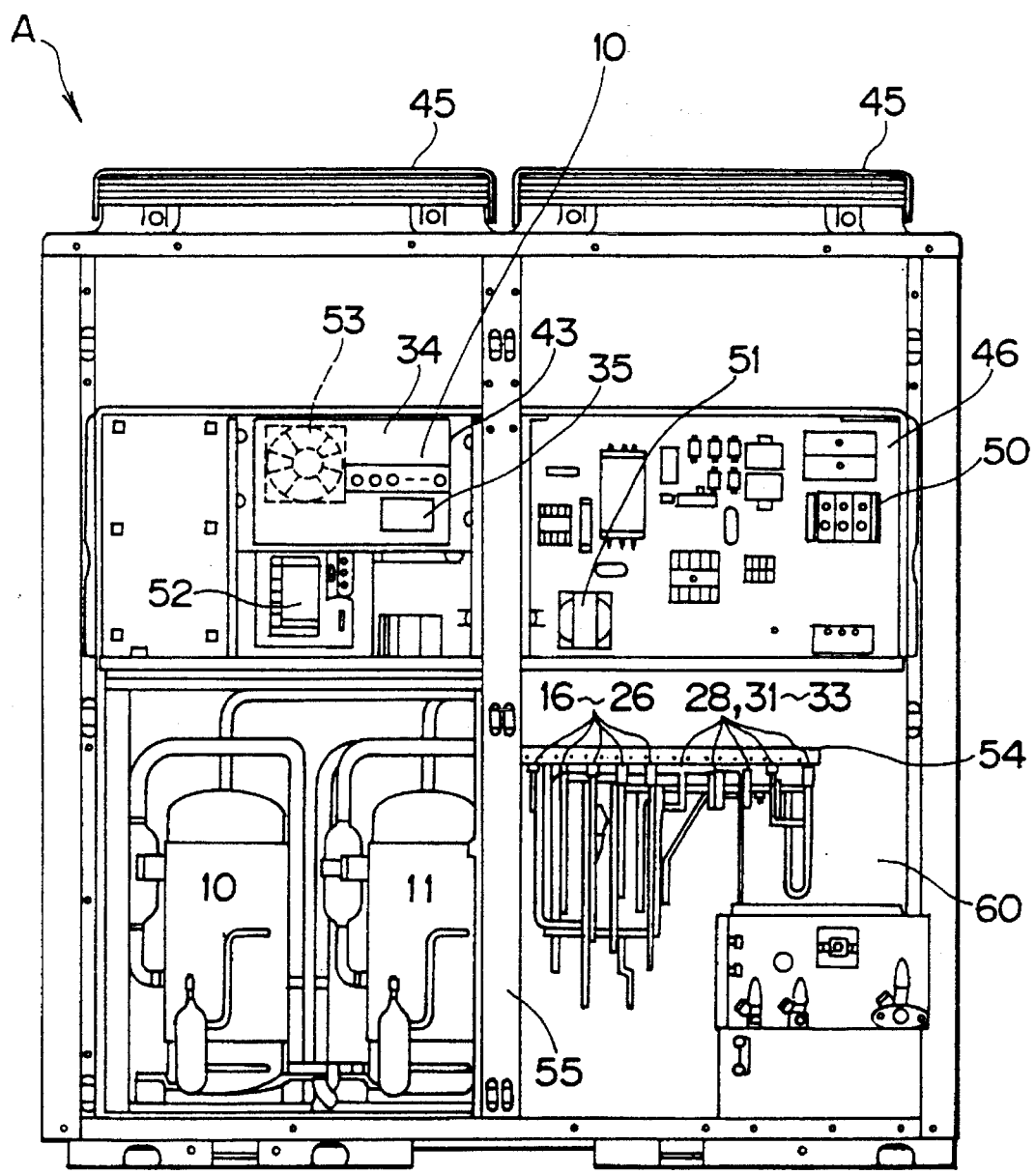
FIG. 11 is a diagram showing the inside of an outdoor unit.

The function of the self-diagnosis display mode M1 will be described below with reference to FIG. 11 showing the construction of the inside of the outdoor unit.

In FIG. 11, the outdoor unit is covered with a mesh (not shown) at the back surface thereof (at the back side in FIG. 11). External air is taken into the outdoor unit through the mesh to be heat-exchanged with an outdoor heat-exchanger (not shown) and then discharge air is discharged through a blow-off grill 45. An oblong box 46 for electrical equipments is disposed in the middle of the outdoor unit. The electrical-equipment box 46 is opened at the front side thereof, and a cover for the electrical-equipment box (not shown) is secured to the opened portion 47. At the lower side and back side of the electrical-equipment box 46 are disposed various kinds of equipments constituting a refrigerant circuit, such as compressors 10 and 11, valves 16 to 26, 28, 31 to 33 for controlling flow of the refrigerant discharged from the compressors, etc.

In the electrical-equipment box 46, a terminal plate 50, a transformer 51, etc. are disposed at the right side, and a print board 34, a power IC 52, etc. are disposed at the left side. Reference numeral 53 represents a cooling fan which is provided at the back side of the print board 34 and cools these electrical equipments. Reference numeral 60 represents a middle partition plate provided at the lower right side of the electrical-equipment box, and it serves to cover equipments disposed at the right side of the outdoor unit. Reference numeral 54 represents a valve mount stand extending horizontally from a pillar 55 to the right side, and the various kinds of valves 16 to 26, 28 and 31 to 33 are linearly arranged on the valve mount stand.

When service check is conducted on this outdoor unit, plural outdoor units and indoor units are connected through interunit pipes or signal lines, and then a front panel and an electrical equipment panel of the outdoor unit are taken out to keep the outdoor unit in the state shown in FIG. 11. Thereafter, a service driving operation is carried out with a remote controller (not shown) or the like.

The LED lamps L1 to Ln are provided on the print board 34, and are originally used to indicate "self-diagnosis function" representing the content of abnormality when any abnormality occurs in the air conditioner containing the outdoor unit. For example, as shown in FIG. 10, if first and sixth LED lamps are turned on, it indicates "OOOreception failure", and if second and sixth LED lamps are turned on, it indicates "ΔΔΔtransmission failure". Here, by short-circuiting an adjustment change-over switch 11 (see FIG. 9) provided on the print board 34, the display mode of the LED lamps L1 to Ln8 is changed to the voltage adjustment display mode M2.

The voltage adjustment display mode M2 is used to indicate a coincidence degree as to whether a standard detection voltage (for example, 3.91 V) to be output from the voltage detection circuit 6 when a standard adjustment voltage (for example, 400 V) is input as the source voltage to the inverter is applied as the detection voltage VD to the A/D conversion input port 12 of the controller 7, that is, whether the detection voltage VD when the standard adjustment voltage is input to the inverter is coincident with the standard detection voltage. The reason for using the voltage adjustment display mode M2 is as follows. The A/D conversion rate at the A/D conversion input port 12 of the controller 7 is beforehand set, and the V/f control amount to be adjusted by the controller 7 is determined on the basis of the A/D conversion value of the detection voltage VD to be applied to the A/D conversion input port 12, so that an error of the input voltage level at the A/D conversion input port 12 (i.e., the detection voltage VD) induces a control error. Accordingly, in order to perform the V/f control in accordance with the supplied source voltage VIN with high precision by the controller 7, the voltage levels of the source voltage VIN and the detection voltage VD are required to accurately correspond to each other. Therefore, the detection voltage VD may be adjusted by the variable resistor 13 to meet the above requirement.

In this case, the adjustment amount of the resistor 13 must be adjusted by a checker, and thus the check work is required to be easily and accurately performed. In view of the foregoing, according to the second embodiment of this invention, the check work for checking whether the proper voltage adjustment is made is easily performed by seeing the turn-on state of the LED display unit 10 in the voltage adjustment display mode M2.

In the voltage adjustment display mode, the LED lamps L1 to L3 of the lamps L1 to L8 are used as an adjustment state display area DSP1, and the coincidence degree of the detection voltage VD to the input set voltage of the A/D conversion input port 12 is displayed using the three LED lamps L1 to L3. In order to detect the coincidence degree, the standard adjustment voltage (for example, VIN=400 V) is set, and the voltage detection circuit 6 is beforehand designed so as to provide the standard detection voltage VD (for example, 3.91 V) at this time. The actual detection voltage VD of the voltage detection circuit 6 and the standard detection voltage VD as described above are compared with each other using a comparison program provided in the controller 7, and the comparison result (differential value) is output to a display output port 14.

The turn-on state of the lamps L1 to L3 is beforehand determined as shown in FIG. 10. That is, if the detection voltage VD (standard detection voltage) corresponding to the standard source voltage is applied to the A/D conversion input port 12, only the LED lamp L2 is turned on. If the detection voltage VD is slightly lower than the standard detection voltage VD, the LED lamps L1 and L2 are turned on. If the detection voltage VD is still lower than the standard detection voltage VD, the LED lamp L2 adjacent to the LED lamp L1 is turned on. On the other hand, if the detection voltage VD is slightly higher than the standard detection voltage VD, the LED lamps L2 and L3 are turned on, and if the detection voltage VD is excessively higher than the standard detection voltage VD, the LED lamp L3 is turned on.

Further, by allocating four LED lamps L5 to L8 of the LED lamps L1 to L8 to a voltage section display area DSP2, a voltage section in which the current source voltage VIN is located can be displayed. The display of the voltage section display area DSP2 can be identified on the basis of the detection voltage supplied to the A/D conversion input port using a program in the controller 7.

The self-diagnosis display mode M1 and the voltage adjustment display mode M2 can be switched to each other through an on/off operation of the adjustment change-over switch 11 in accordance with a switch command signal from the external. When the adjustment change-over switch 11 is short-circuited, a signal of logic "L" is applied to the controller 7 to execute the corresponding control program.

Like the first embodiment, the V/f value data for performing the V/f control for the inverter air conditioner are stored in the ROM in the form of V/f control compensating table (hereinafter referred to as "table"), and an example of the V/f control compensating table is shown in FIGS. 12 and 13.

Like the first embodiment, in order to allow the inverter air conditioner to be used for a wide range of input voltage VIN, three kinds of tables TBL1, TBL2 and TBL3 are provided as the table in correspondence with three voltage sections A, B and C of the input voltage VIN. In this embodiment, the same voltage sections and tables as the first embodiment are assumed to be provided, and thus the description on the sections and the tables will be described with reference to FIGS. 3 and 4.

The table TBL1 has V/f values every predetermined frequency f in a voltage range of 342 V to 389 V with a control reference voltage V01 (for example, 370 V) at the center of the voltage range (see FIG. 4), the table TBL2 has V/f values every predetermined frequency f in a voltage range of 390 V to 409 V with a control reference voltage V02 (for example, 400 V) at the center of the voltage range, and the TBL3 has V/f values every predetermined frequency f in a voltage range of 410 V to 457 V with a control reference voltage V03 (for example, 430 V) at the center of the voltage range.

Next, the driving operation of the inverter air conditioner of this embodiment will be described. In this embodiment, the same driving operation as the first embodiment, and thus the description of the driving operation of this embodiment will be described with reference to FIG. 5.

First, in order to perform the proper V/f control, the input voltage VIN supplied to the converter 1 must be read out. The read-out of the input voltage VIN is performed by the voltage detection circuit 6 while the air conditioning unit 4 is stopped (specifically, while the parts associated with flow of the refrigerant such as the converter 1, the inverter 2, the compressor 3, etc. are stopped) (step S11, S12).

The determination of the input voltage VIN is preferably performed using the average value of voltage values which are read out (measured) for a predetermined time. The detection voltage VD of the voltage detection circuit 6 is input to the controller 7. The controller 7 executes the following operating control according to the algorithm shown in FIG. 5.

That is, the table in which the optimum V/f values (f01 to f03) corresponding to the detection voltage VD are stored is selected from the three tables TBL1, TBL2 and TBL3 (step S13). When the input voltage is unvaried in this state, that is, when the variation rate ΔV is within a predetermined reference value Vref, the compressor 3 is driven using the V/f value at that time according to a driving control flow (not shown) and the steps S13 and S14 are repeated. On the other hand, when the variation rate ΔV of the input voltage VIN exceeds the reference value Vref (step S14:Yes), the process goes to step S15 to read out the input voltage VIN again. At this time, in order to ensure safety for the operation, the input voltage VIN is read out again while the operation of the air conditioning unit 4 is temporarily stopped. However, the operation of the air conditioning unit 4 would not be required to be stopped if alteration of the V/f value which is required due to alteration of the table can be smoothly performed. In this case, a program for moderately altering the V/f value or the like may be provided at the step S13.

As described above, when the input voltage VIN is varied, the optimum V/f value corresponding to the input voltage VIN after variation is selected again, and then the air conditioning operation is performed on the basis of the selected optimum V/f value.

Accordingly, according to the inverter air conditioner of this embodiment, even when the inverter air conditioner is placed and used in countries or areas where the different voltage sections shown in FIG. 3 are respectively used, the proper and optimum table is automatically selected from the V/f control compensating tables TBL1, TBL2 and TBL3 to meet the voltage circumstances of each country or area insofar as one of the three V/f control compensating tables is applicable to these countries or areas. Therefore, the wide range operation of the air conditioner can be performed. In addition, the output voltage VOUT of the inverter 2 is not greatly varied unlike the prior art (see FIG. 7), and fluctuation (variation) degree from the center voltage C in the up-and-down direction is more reduced as shown in FIG. 6, so that there occur no overexcitation and no torque deficiency in the motor of the compressor 3.

In the above embodiment, the LED lamps are used for the display unit. However, the display unit of this invention is not limited to the LED lamps, and any modification may be made to the display unit. For example, a liquid crystal display may be used as the display unit.

As described above, according to this invention, the controller includes the reference means in which the V/f value data corresponding to the input voltages are stored, and it controls the driving operation on the basis of the optimum V/f value data in accordance with variation of the input voltage, so that the optimum V/f control can be performed at all times irrespective of a wide range of voltage variation. In addition, the detection voltage of the source voltage detection circuit can be easily adjusted, so that a high-precision V/f driving operation can be performed on the basis of the adjusted detection voltage in accordance with a different source voltage.

What is claimed is:

1. An air conditioner including:

a power-variable compressor;

an inverter for controlling said compressor to vary a driving frequency of said compressor on the basis of the ratio of an output voltage (V) thereof which corresponds to an air conditioning load and a driving frequency (f) of said compressor;

a controller for supplying a variable-frequency control instruction in accordance with the air conditioning load to said inverter; and an input voltage detector for detecting a source voltage input to said inverter, wherein said controller includes reference means for beforehand storing V/f value data corresponding to plural voltage sections to which a predetermined range of the input voltage to said inverter is divided at a predetermined voltage interval, and selects data representing the ratio (V/f) of the output voltage (V) corresponding to the detected input voltage and the driving frequency (f) from said reference means to output the variable frequency control instruction to said inverter so that an air conditioning operation is carried out in accordance with the air conditioning load.

2. The air conditioner as claimed in claim 1, wherein said input voltage detector includes an insulating transformer for reducing an input voltage to said inverter to a voltage suitable for a subsequent signal processing, a bridge rectifying circuit for rectifying the secondary voltage of the reduced voltage, and a ripple filter comprising a capacitor and a resistor for removing a ripple component of the rectified output of said bridge rectifying circuit and outputting the ripple-removed output voltage as a detection voltage to said controller.

3. The air conditioner as claimed in claim 1, wherein said input voltage detector further includes a detection voltage adjusting unit which is connected between the output stage of said ripple filter and said controller, and serves to adjust the voltage level of the detection voltage of said input voltage detector so that the detection voltage accurately corresponds to the input voltage to said inverter.

4. The air conditioner as claimed in claim 3, wherein said detection voltage adjusting unit includes a voltage divider comprising a resistor and a variable resistor.

5. The air conditioner as claimed in claim 3, further comprising a display unit for a self-diagnosis of said air conditioner and a voltage adjustment of the detection voltage, said display unit being connected to said controller to assist the self-diagnosis of said air conditioner and the voltage adjustment of the detection voltage of said input voltage detector on the basis of a control signal from said controller.

6. The air conditioner as claimed in claim 5, wherein said display unit has a self-diagnosis display mode for displaying operating states of respective parts of said air conditioner to perform the self-diagnosis display and a voltage adjustment display mode for displaying information on deviation of the detection voltage from a reference voltage, the self-diagnosis display mode and the voltage adjustment display mode being switched to each other by a display switching signal from an external.

7. The air conditioner as claimed in claim 3, wherein said controller includes comparison means for comparing an actual detection voltage of said input voltage detector and a reference detection voltage with each other when a reference input voltage is applied to said inverter and outputting the comparison result to said display unit to indicate the deviation degree of the actual detection voltage from the reference detection voltage, whereby the detection voltage is adjusted to a proper value in accordance with the deviation degree displayed on said display unit.

8. The air conditioner as claimed in claim 6, wherein said display unit comprises plural LED lamps which are linearly arranged, and the operating states of said air conditioner and the information on the deviation of the detection voltage from the reference voltage are indicated by a predetermined turn-on and turn-out arrangement of said LED lamps.

9. The air conditioner as claimed in claim 8, wherein said display unit further displays information on a current source voltage or a voltage section containing the current source voltage.

10. The air conditioner as claimed in claim 5, wherein said display unit comprises a liquid crystal display.

11. The air conditioner as claimed in claim 1, wherein said controller stops the operation of said compressor when reading out the V/f value data from said reference means to output the variable frequency control instruction.

12. An inverter type air conditioner, including:

source voltage detection means for detecting a voltage of a voltage source connected to said air conditioner; and A/D conversion means which conducts A/D-conversion on the detected source voltage and whose conversion rate is beforehand set, the driving frequency of a compressor being variably controlled on the basis of the A/D-converted detection voltage, wherein said A/D conversion means includes voltage adjusting means which is provided between an output portion of said source voltage detection means and an input portion of said A/D conversion means and serves to adjust the voltage level of the detected voltage output from said source voltage detection means to a predetermined input voltage level, and monitor display means for indicating a coincidence degree between the predetermined input voltage level of said A/D conversion means and the voltage level of the detected source voltage.

13. The inverter type air conditioner as claimed in claim 12, wherein said voltage adjusting means comprises a dividing circuit for dividing the output voltage of said source voltage detection means.

14. The inverter type air conditioner as claimed in claim 12, wherein said monitor display means is formed of LED display units for displaying operating states, and switched to a display mode.

* * * * *